United States Patent
Howe

(10) Patent No.: US 7,724,647 B2
(45) Date of Patent: May 25, 2010

(54) METHOD AND SYSTEM FOR FAST CHANNEL CHANGE IN A DOCSIS SET TOP GATEWAY DEVICE

(75) Inventor: Jeffrey J Howe, West Chicago, IL (US)

(73) Assignee: ARRIS Group, Inc., Suwanee, GA (US)

( * ) Notice: Subject to any disclaimer, the term of this patent is extended or adjusted under 35 U.S.C. 154(b) by 558 days.

(21) Appl. No.: 11/594,590

(22) Filed: Nov. 8, 2006

(65) Prior Publication Data

US 2007/0104090 A1    May 10, 2007

Related U.S. Application Data

(60) Provisional application No. 60/734,738, filed on Nov. 8, 2005.

(51) Int. Cl.
*H04J 1/16*     (2006.01)
(52) U.S. Cl. ........................... 370/216; 370/486
(58) Field of Classification Search ............ None
See application file for complete search history.

(56) References Cited

U.S. PATENT DOCUMENTS

| | | | |
|---|---|---|---|
| 6,510,162 B1 * | 1/2003 | Fijolek et al. ............... | 370/432 |
| 6,751,230 B1 * | 6/2004 | Vogel et al. ................. | 370/432 |
| 7,058,007 B1 * | 6/2006 | Daruwalla et al. .......... | 370/216 |
| 7,058,559 B1 * | 6/2006 | Roeck et al. ................. | 703/21 |
| 2002/0136203 A1 * | 9/2002 | Liva et al. ................... | 370/352 |
| 2004/0008683 A1 * | 1/2004 | Cloonan et al. ............. | 370/395.4 |
| 2006/0088056 A1 * | 4/2006 | Quigley et al. .............. | 370/468 |
| 2007/0140298 A1 * | 6/2007 | Eng ............................ | 370/485 |
| 2007/0195824 A9 * | 8/2007 | Chapman et al. ............ | 370/490 |

\* cited by examiner

*Primary Examiner*—Min Jung
(74) *Attorney, Agent, or Firm*—Troy A. Van Aacken; Robert J. Starr

(57) ABSTRACT

A DOCSIS set-top gateway device uses multiple embedded cable modems so that one eCM can remained tuned to a frequency being used for a current two-way data session and another eCM can be used to tune to a different frequency. The other eCM that tunes to a different frequency is disabled from operating in the upstream direction to avoid conflict with the two-way eCM in communicating with a CMTS.

The eCMs in the DSG are controlled by a client controller that interfaces applications local to the DSG to a central device, such as a CMTS. A message may be sent to a client application requesting content on a traffic flow using a different frequency than the two-way capable sCM. The client controller instructs the upstream-disabled eCM to tune to the different frequency, meanwhile the two-way eCM stays tuned to the current frequency.

18 Claims, 3 Drawing Sheets

METHOD AND SYSTEM FOR FAST CHANNEL CHANGE IN A DOCSIS SET TOP GATEWAY DEVICE

CROSS REFERENCE TO RELATED APPLICATION

This application priority under 35 U.S.C. 119(e) to Howe, U.S. provisional patent application No. 60/734,738 entitled "DSG STB architecture to allow fast channel changes," which was filed Nov. 8, 2005, and is incorporated herein by reference in its entirety.

FIELD OF THE INVENTION

The present invention relates generally to broadband communication networks, and more particularly to facilitating fast channel changes in a set top box that delivers programming via a broadband format.

BACKGROUND

Cable data systems are used to allow cable TV subscribers use the Hybrid-Fiber-Coax network as a communication link between their home networks and the Internet. As a result, computer information (Internet Protocol packets) can be transmitted across the Hybrid-Fiber-Coax network between home computers and the Internet. The Data Over Cable Service Interface Specification ("DOCSIS")—defined by CableLabs®—specifies the set of protocols that must be used to effect a data transfer across the Hybrid-Fiber-Coax network ("HFC"). Two fundamental pieces of equipment facilitate this data transfer: a cable modem ("CM") which is positioned in the subscriber's home, and a Cable Modem Termination System ("CMTS") which is positioned in the head end of the cable TV company.

In addition to data traffic, subscribers are more and more obtaining telephony voice services over networks other than the traditional public switched telephony network ("PSTN"). A multiple services operator ("MSO") may provide such telephony services, in addition to data over cable service via DOCSIS. For example, CableLabs has established the PacketCable™ standard for providing telephony services over cable. A subscriber typically has a device that includes a DOCSIS cable modem for transmitting and receiving data and a media terminal adaptor ("MTA"), or embedded MTA ("eMTA") for processing voice traffic for transmission and reception over cable.

Subscribers are also receiving video content from their traditional cable television service provider that is delivered digitally instead of as an analog signal. For example, a typical 6 MHz (in United States) channel that carries a single analog video signal may carry multiple video content programs in a digital format. Moreover, the digital video content signals may be delivered according to Internet Protocol, which is known in the art. To facilitate the delivery of digital video to a subscriber, a DOCSIS set-top gateway device ("DSG") may be used, as described in "DOCSIS Set-top Gateway (DSG) Interface Specification," having application Ser. No. 11/808,510, which is Copyrighted 2001-2005 Cable Television Laboratories, Inc., (hereinafter referred to as the "DSG specification") and is incorporated herein by reference in its entirety.

Among other aspects, the DSG specification defines a one-way mode of operation and a two-way mode of operation. The two-way mode facilitates interactive out-of-band communications between Set-top Controller and the Set-top Device. If the Set-top device cannot send data in the upstream direction, the device goes into the degraded one-way mode and cannot continue interactive communication with the controller. Although there are error conditions that can cause the Set-top Device to go into one-way mode which the device has no control over, there are also scenarios where the DSG Client Controller directs the DSG's embedded cable modem ("eCM") to go into one-way mode. For example, the client controller may decide that it needs to 'listen' to a DSG tunnel on a different downstream channel, either because the original tunnel no longer applies to the embedded set-top box ("eSTB"), or the eSTB has multiple DSG clients that need access to different tunnels.

As a result, the eCM needs to tune to a new channel, and while the eCM registers on the new channel, the Set-top device will either have no communication or will be in one-way mode—in other words in a degraded mode. Since one or more users that are using the set-top box device may need uninterrupted upstream capability, there is a need in the art for a method and system that minimizes this amount of time a set-top box device operates in degraded mode when the degradation is due to actions under the DSG Client Controller's control.

DETAILED DESCRIPTION

As a preliminary matter, it will be readily understood by those persons skilled in the art that the present invention is susceptible of broad utility and application. Many methods, embodiments and adaptations other than those herein described, as well as many variations, modifications, and equivalent arrangements, will be apparent from or reasonably suggested by the following description, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
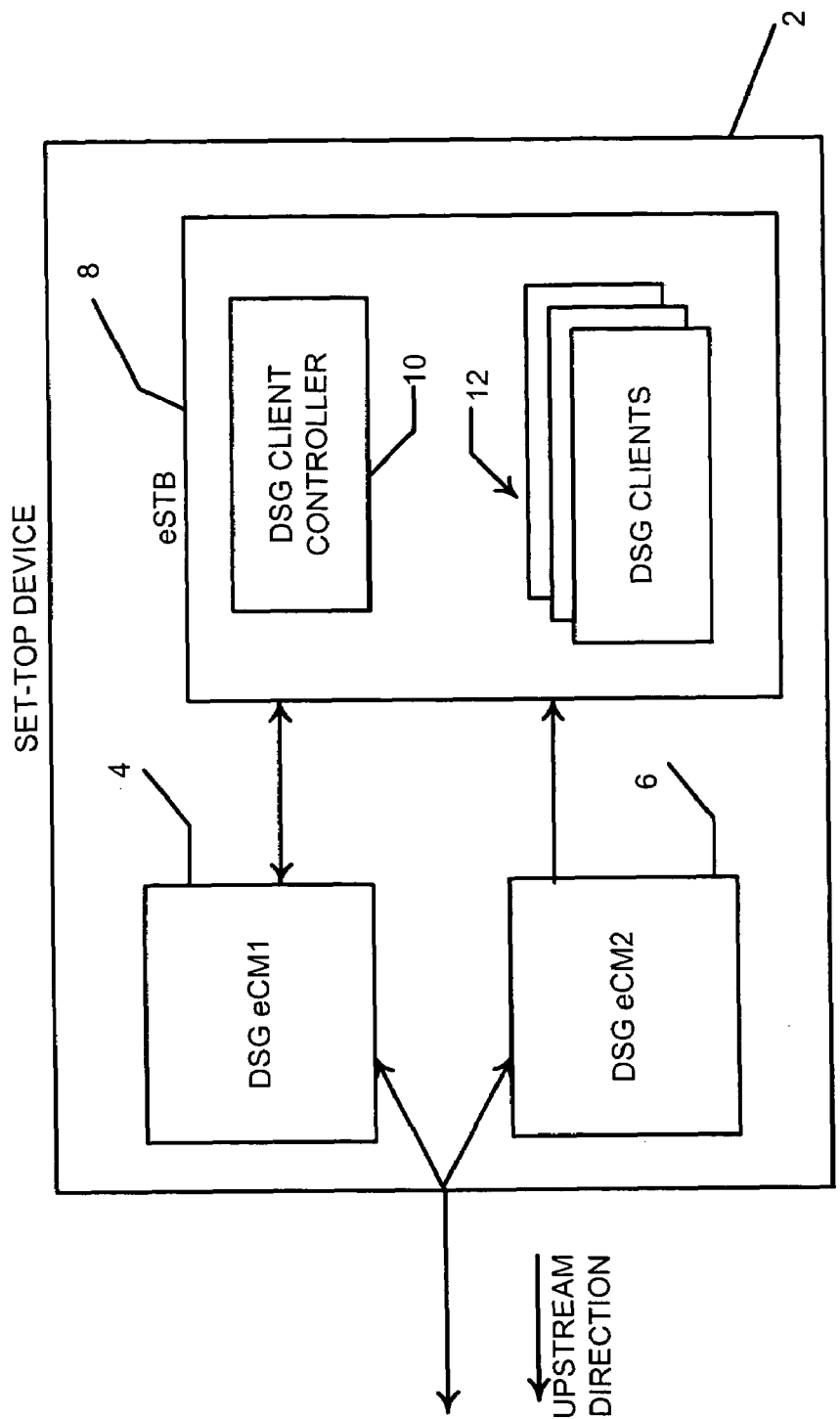
FIG. 1 illustrates a block diagram of a DOCSIS set-top gateway device using more than one eCM.

Turning now to the figures, FIG. 1 illustrates a block diagram of a DOCSIS set-top gateway device 2 using more than one eCM. First DOCSIS set-top gateway embedded cable modem 4 and second DOCSIS set-top gateway embedded cable modem 6 are coupled to embedded set-top box ("eSTB") 8. eSTB 8 includes DSG controller 10, which controls DSG clients 12 that may be active in the eSTB. DSG clients 12 may include an application to receive video content, an application to interface with voice content, and an application to interface with upstream and downstream data, among other types of applications known in the art.

In an aspect, second DSG eCM 6 is configured to operate in the downstream direction only. If a user of set-top device 2 is currently accessing data, for example, with first eCM 4, and also accessing video content, the video content and downstream data may both be transmitted over the same downstream frequency. If both are transmitted at the same frequency, first eCM 4 can receive the multiple traffic flows simultaneously. However, if a DSG client 12 needs to access a 'tunnel,' or channel, that is carried over a different frequency to access different video content, for example, DSG client controller 10 can send a message to second eCM 6 to tune to the new frequency. This provides the advantage that the traffic flow frequency that is tuned for receiving the downstream data is not interrupted. It will be appreciated that a tunnel for upstream and downstream data traffic may be used for messaging between DSG client controller 10 and a remote central device such as a CMTS. Such messaging may be a message traffic flow containing a request for content that is carried on a different frequency that the message traffic flow, and a return message informing controller 10 which frequency carries the requested content.

Figure 2:
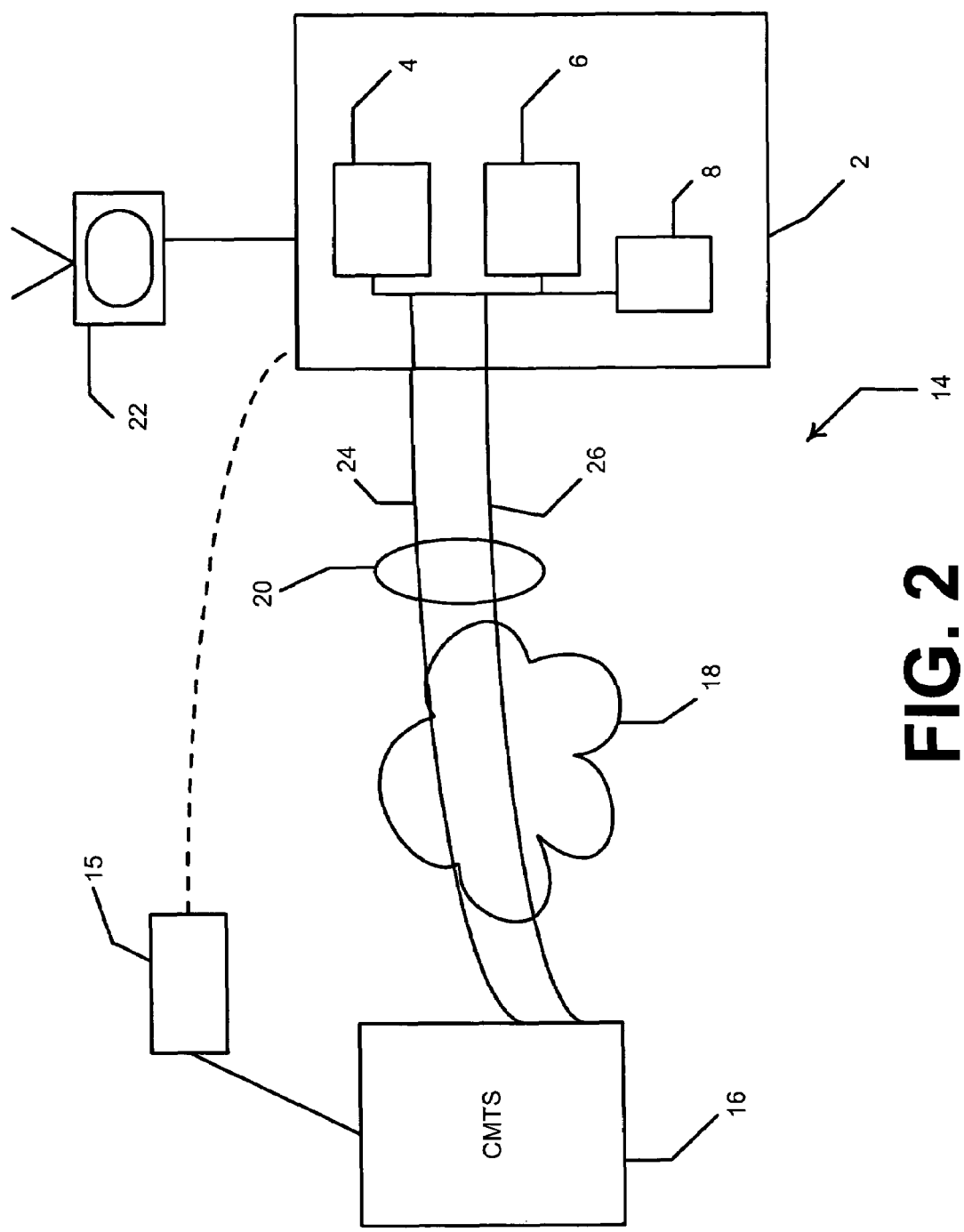
FIG. 2 illustrates a system using a DOCSIS set-top gateway device having more than one eCM.

Turning now to FIG. 2, a system 14 using a DOCSIS set-top gateway device having more than one eCM is shown. Set top device 2 communicates with one or more set-top controllers 15 via CMTS 16 over HFC 18, which typically caries multiple channels 20. Thus, a user may be watching video device 22 that is coupled to set top device 2. Video content may be delivered over a first frequency 24 and messaging between set top device 2 and set-top controller 15 may be carried over a second channel frequency 26. Thus, if DSG client controller 8 needs to send an upstream message to set-top controller 15, first eCM 4 can send upstream information to the set-top controller via CMTS 16. eCM 4 can also receive downstream information in response to the upstream information sent that may provide information for second eCM 6 to tune to a different downstream channel from which it is currently tuned to receive content that is newly selected by the user watching device 22. To facilitate two or more eCMs of the same device being simultaneously tuned to CMTS 16, an upstream transmitter of second eCM 6 is disable so that two different eCMs associated with a single MAC address of client controller 8 do not attempt to register with the CMTS.

Figure 3:
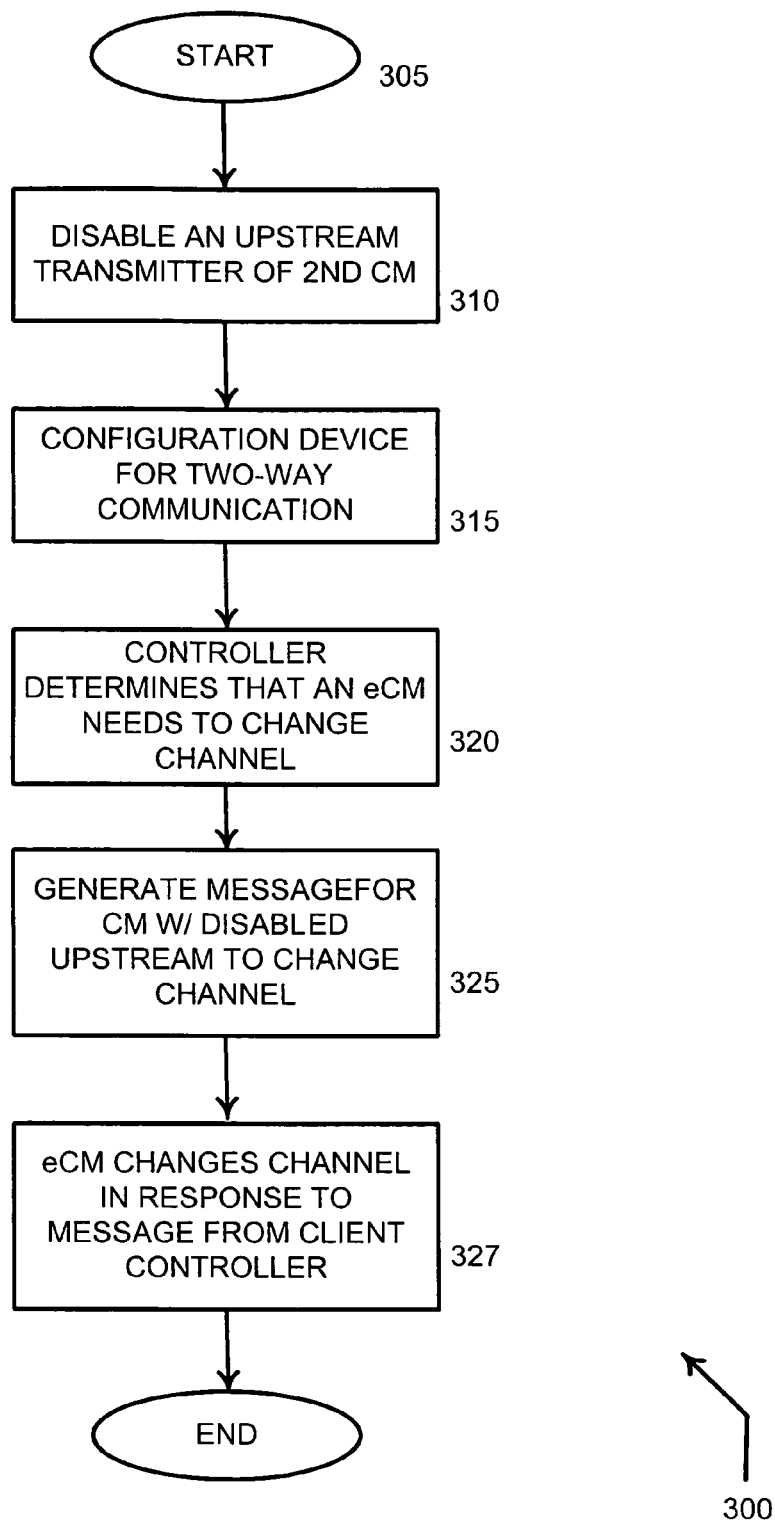
FIG. 3 illustrates a flow diagram of a method for minimizing the amount of time a DCOSIS set-top gateway device operates in a degraded mode.

Turning now to FIG. 3, a flow diagram of a method 300 for using multiple eCMs to reduce the amount of time a set top device operates in a degraded mode is shown. Method 300 starts at step 305. At step 310 upstream operation of transmitters in all but one of a plurality of eCMs are disabled. The disabling of the upstream transmitters may be performed at the time of manufacture, or under the control of software loaded in the set top device containing the plurality of eCMs.

At step 315 the remaining eCM in the set top device is configured for two-way operation. Typically, this process comprises ranging and registering with a CMTS as known in the art.

After the set top device has been configured for two way operation on only one of a plurality of eCMs, a DSG client controller determines that it needs access to a different downstream tunnel on a different downstream channel from that which is currently tuned by any of the eCMs. In response to this determination, the controller generates at step 325, a message to an eCM that has been disabled for upstream operation to tune to a different channel. The eCM that is directed to tune to the new downstream channel tunes to the instructed channel at step 327 and method 300 ends at step 330. In a dual eCM arrangement, for example, since the eCM that is not configured for upstream operation is tuned to the new channel, the eCM that is capable of upstream operation remains tuned to the tunnel(s) that it has been using for data transmission. Thus, time in the degraded mode for the two-way eCM of the set top device is minimized, with the result that a user perceives, for example, reduced time between channel changes.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for reducing the amount of time a subscriber communication device operates in a degraded mode, comprising:

disabling an upstream transmitter of a second cable modem device coupled to and providing at least downstream communication capability for the communication device;

configuring the communication device for two-way communication via a first cable modem device coupled to and providing two-way communication capability for the communication device; and directing the second cable modem to change downstream channels in response to a message from a controller.

2. The method of claim 1 wherein the communication device is a DOCSIS set-top gateway device.

3. The method of claim 1 wherein the controller is a DOCSIS set-top gateway client controller.

4. The method of claim 1 wherein the first and second cable modem devices and the communication device are enclosed by the same housing.

5. The method of claim 1 wherein the message from the controller is a message instructing the second cable modem to tune to a DSG tunnel that is transmitted over a different channel than a channel to which the second cable modem is currently tuned.

6. A system for reducing the amount of time a subscriber communication device operates in a degraded mode, comprising:

means for disabling an upstream transmitter of a second embedded cable modem device coupled to and providing at least downstream communication capability for the communication device;

means for configuring the communication device for two-way communication via a first embedded cable modem device coupled to and providing two-way communication capability for the communication device; and means for directing the second embedded cable modem to change downstream channels.

7. The system of claim 6 wherein the communication device is a DOCSIS set-top gateway device.

8. The system of claim 6 wherein the means for directing the second embedded cable modem to change channels is a DOCSIS set-top gateway client controller.

9. The system of claim 6 wherein the first and second embedded cable modem devices and the communication device are enclosed by the same housing.

10. The system of claim 6 wherein the message from the controller is a message instructing the second embedded cable modem to tune a DSG tunnel that is transmitted over a different channel than a current channel to which the second embedded cable modem is currently tuned.

11. The system of claim 6 wherein the means for disabling an upstream transmitter of the second embedded cable modem device is a software application.

12. A system for reducing the amount of time a subscriber communication device operates in a degraded mode, comprising:
- first communication means for communicating downstream between a central device and the communication device, said first communication means for downstream communicating being disabled for operation in the upstream direction:
- second communication means for two-way communication between the communication device and a central device; and
- means for directing the first communication means to change downstream channels, said directing means being coupled to the first and second communication means.

13. The system of claim 12 wherein the first communication means is an eCM.

14. The system of claim 12 wherein the second communication means is an eCM.

15. The system of claim 12 wherein the directing means is a DOCSIS set-top gateway client controller.

16. A subscriber device for communicating with a cable television network, comprising:
- a plurality of embedded cable modems, each providing downstream communication capability for the subscriber device;
- all but one of the cable modems having upstream communication capability either lacking or disabled; and
- one of the plurality of cable modems providing both upstream and downstream communication capability to the subscriber device.

17. The subscriber device of claim 16 wherein the subscriber device is a DOCSIS set-top gateway device.

18. The subscriber device of claim 16 wherein each of the cable modems with upstream capability lacking or disabled can respond to a message to tune to a DSG tunnel that is transmitted over a different channel than a channel to which the cable modem receiving the message is currently tuned.

* * * * *